Nov. 27, 1962 G. C. SYLVESTER ETAL 3,065,685
MODULAR AIR DIFFUSER
Filed Dec. 3, 1959 10 Sheets-Sheet 1

INVENTORS
GORDON C. SYLVESTER
FRANK A. FREESE
ROBERT W. KROGSTAD
BY John W. Michael
ATTORNEY Nov. 27, 1962 G. C. SYLVESTER ETAL 3,065,685
MODULAR AIR DIFFUSER
Filed Dec. 3, 1959 10 Sheets—Sheet 2

INVENTORS
GORDON C. SYLVESTER
FRANK A. FREESE
ROBERT W. KROGSTAD
BY John W. Michael
ATTORNEY INVENTORS
GORDON C. SYLVESTER
FRANK A. FREESE
ROBERT W. KROGSTAD
BY John W. Michael
ATTORNEY Nov. 27, 1962     G. C. SYLVESTER ETAL     3,065,685
MODULAR AIR DIFFUSER Filed Dec. 3, 1959     10 Sheets-Sheet 4

INVENTORS
GORDON C. SYLVESTER
FRANK A. FREESE
BY ROBERT W. KROGSTAD

John W. Michael
ATTORNEY

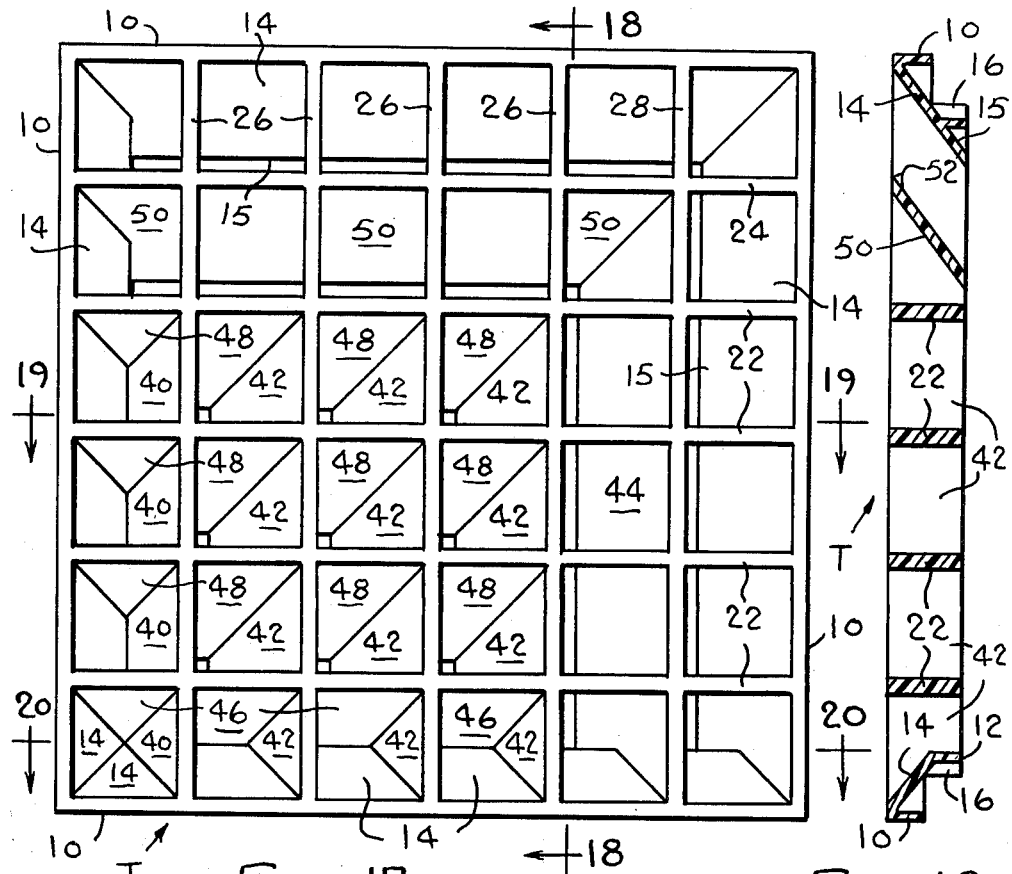
FIG. 17
FIG. 18
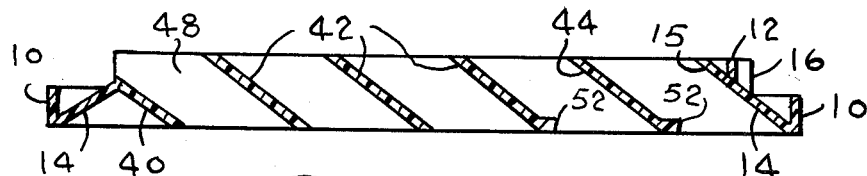
FIG. 19
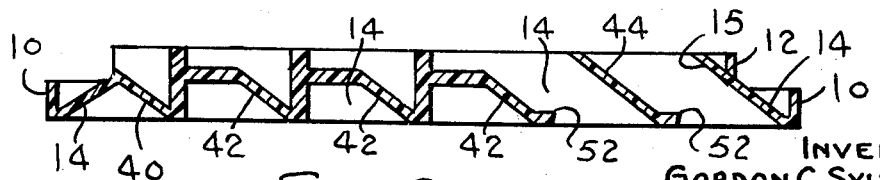
FIG. 20
INVENTORS
GORDON C. SYLVESTER
FRANK A. FREESE
ROBERT W. KROGSTAD
BY John W. Michael
ATTORNEY Nov. 27, 1962  G. C. SYLVESTER ETAL  3,065,685
MODULAR AIR DIFFUSER
Filed Dec. 3, 1959                                                10 Sheets-Sheet 6

INVENTORS
GORDON C. SYLVESTER
FRANK A. FREESE
ROBERT W. KROGSTAD
BY John W. Michael
ATTORNEY

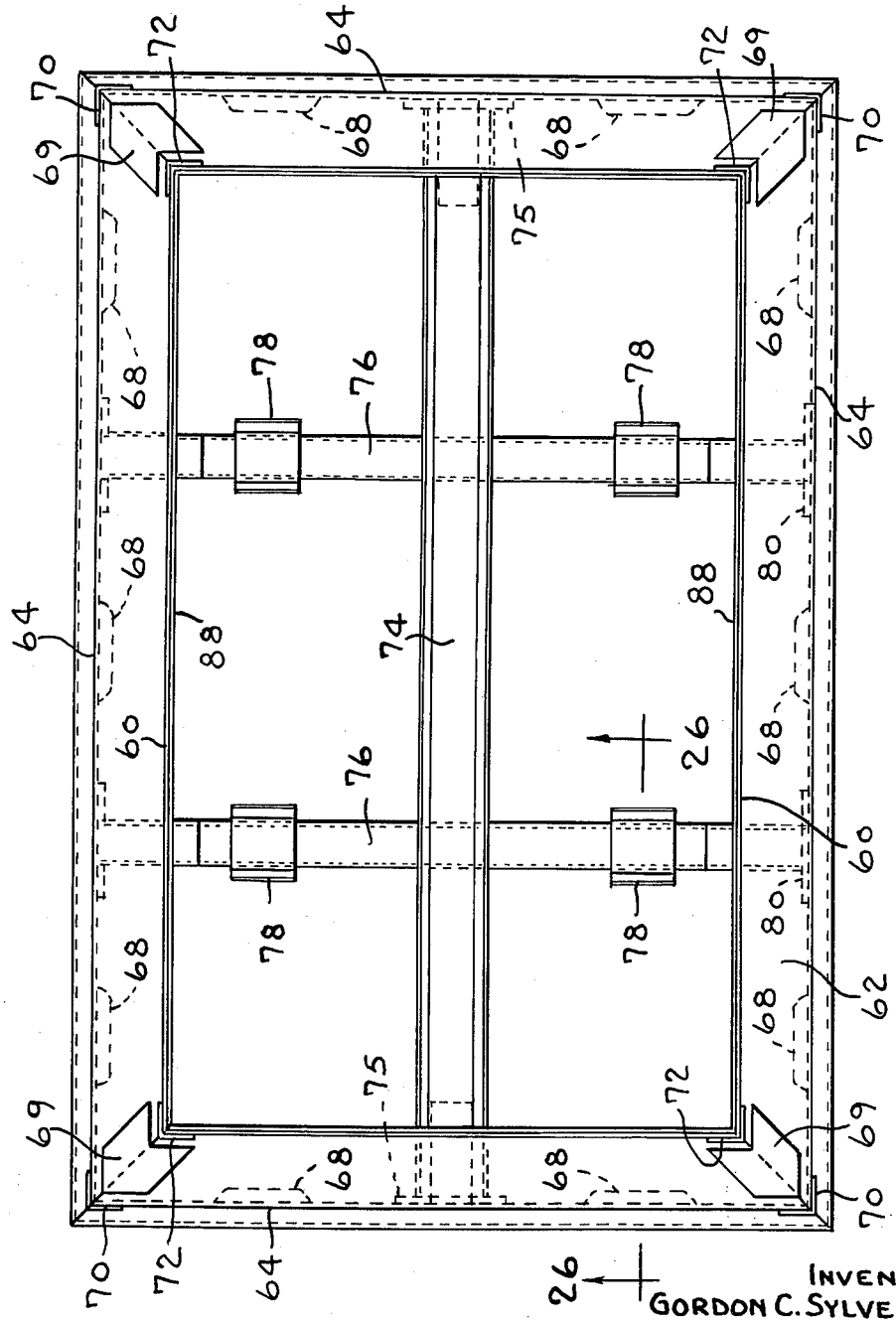

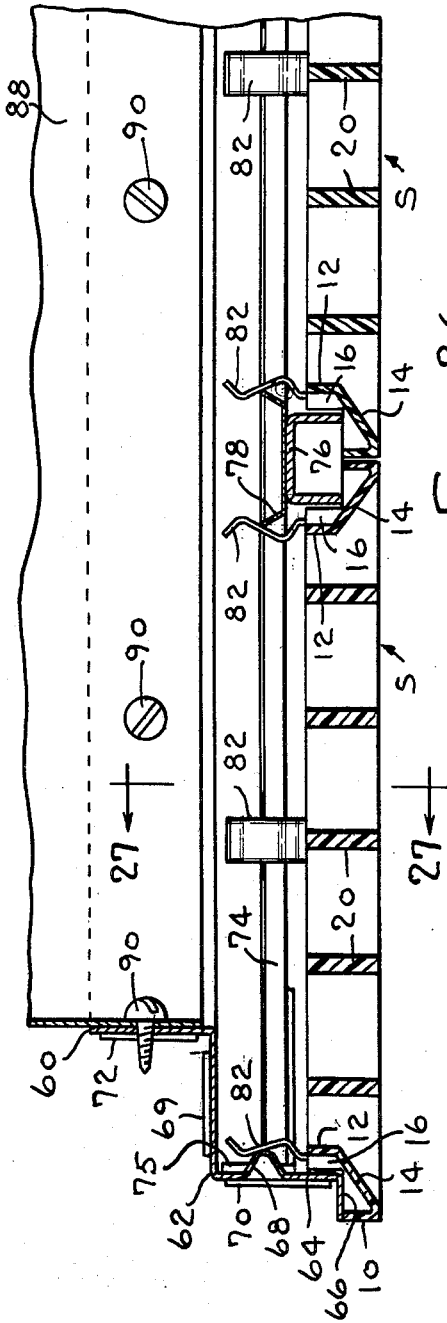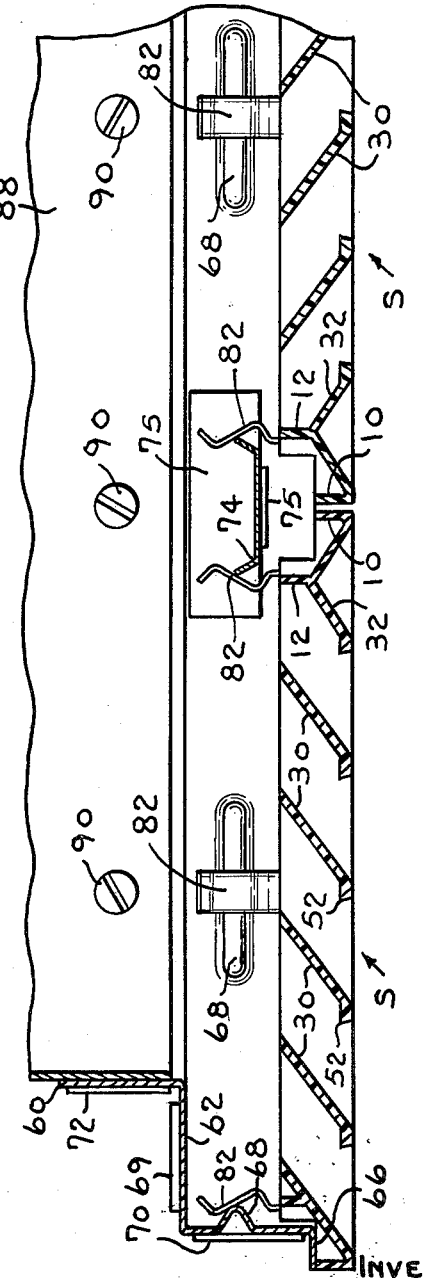

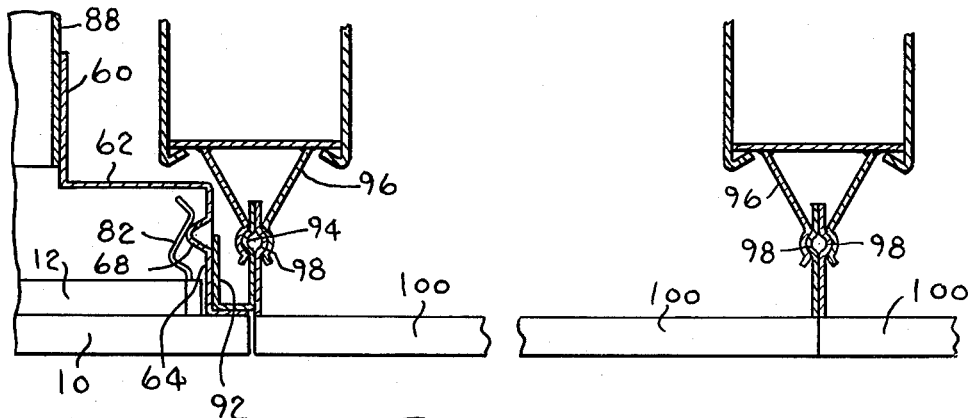
FIG. 28
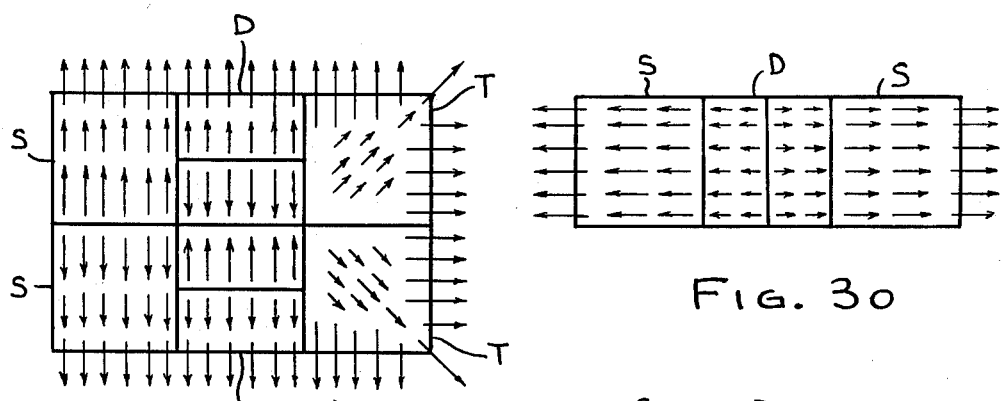
FIG. 29
FIG. 30
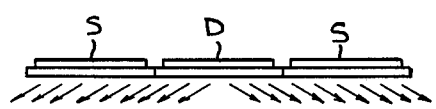
FIG. 31
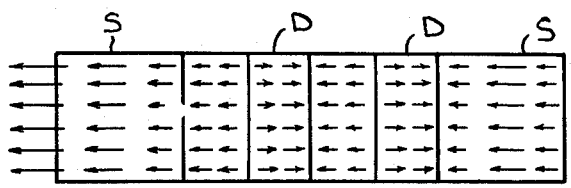
FIG. 32
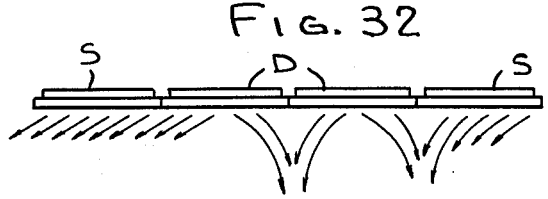
FIG. 33
INVENTORS
GORDON C. SYLVESTER
FRANK A. FREESE
ROBERT W. KROGSTAD
BY John W. Michael
ATTORNEY INVENTORS
GORDON C. SYLVESTER
FRANK A. FREESE
ROBERT W. KROGSTAD
BY
John W. Michael
ATTORNEY United States Patent Office 3,065,685
Patented Nov. 27, 1962

3,065,685
MODULAR AIR DIFFUSER
Gordon C. Sylvester, Verona, and Frank A. Freese and Robert W. Krogstad, Madison, Wis., assignors to Carnes Corporation, Verona, Wis., a corporation of Wisconsin
Filed Dec. 3, 1959, Ser. No. 857,169
9 Claims. (Cl. 98—40)

This invention relates to improvements in air diffusers and particularly to such diffusers which are modular in character and variable in pattern of air distribution.

As used in this specification: "diffuser" defines a frame adapted to be connected to a duct and placed in a wall, ceiling or other partitioning means and one or more modules removably mounted in such frame; "module" defines an air deflecting and diffusing core or insert of a standardized square face which is removably seated in the frame; "face" designates the entire area lying in the plane of the discharge or downstream surface of the module; "module seat" designates the downstream surface of the frame defined by the largest perimeter of such frame; "throw" is one direction of air distribution by a module; "modular in character" defines the dimensional characteristic of the face size of the module being an aliquot of the face size of the frame.

One object of this invention is to provide a module which will deflect and discharge air laterally of the module in one or more throws and also diffuse the air as so discharged.

Another object of this invention is to provide such a module which may be readily seated in and removed from a frame for purposes of cleaning, replacement, and rearrangement of the air distribution pattern.

Another object of this invention is to provide a module which may be seated with other like modules in a frame to form a diffuser having an adjustable and wide variation of air distribution patterns including simultaneously distribution lateral of and normal to the face of the diffuser.

Still another object of this invention is to provide such a module which will have such functional characteristics and will also be: artistic and decorative in appearance; capable of being formed from moulded high strength plastic; and able to hide the metal frame of the diffuser when seated in such frame.

A further object of this invention is to provide a diffuser which can be: inexpensively made in a large variety of sizes from the minimum number of tools and dies; carried in stock with a relatively small inventory for supplying a wide variety of requirements; easily adapted to the plans of architects and air conditioning engineers; and easily installed and adjusted.

In the broad aspects of this invention these objects are obtained by employing: (1) a module which has a square face ($5^{31}/_{32}$" per side) which is substantially equally divided by spaced parallel inclined vanes or louvers and spaced parallel ribs or diffusing members placed at substantially right angles to the vanes and substantially perpendicular to the face of the module; (2) a metal frame having duct engaging neck, side walls for laterally locating the module, and a flange or module seat (the length and width of the seat being multiples of 6"); and (3) cooperating retainer springs and retainer spring locks carried on the module and frame. When the module is snapped in place in the frame its face hides the frame. The face of the module presents a uniform honey-comb appearance which depending upon the placing of the frame may be either flush with the surface of ceiling or wall or projecting about $9/_{32}$". The module may be removed and rotated 90 or 180 degrees to change the direction of the throw or direction of air distribution. The ribs or diffusing members function as strengthening members, help create the checkered face appearance, and divide the air stream to make a better diffusion. When the size of the frame seat is more than one multiple of 6", say 12" x 12", four of the modules are snapped into place to form the diffuser. The modules may be arranged in any desired throw relationship. However, if a direction substantially perpendicular to the face is required adjacent modules are positioned so that their throws are directed toward each other resulting in a component throw which is substantially perpendicularly away from the face.

Other objects and advantages of this invention will become apparent from the following description with reference to the accompanying drawings in which:

FIG. 17 is a plan view of the face of a triple throw module embodying the present invention;

FIG. 18 is a sectional view taken on the line 18—18 of FIG. 17;

FIG. 19 is a sectional view taken on the line 19—19 of FIG. 17;

FIG. 20 is a sectional view taken on the line 20—20 of FIG. 17;

FIG. 25 is a plan view of the rear of a six module frame for a diffuser embodying the present invention;

FIG. 26 is an enlarged fragmentary sectional view taken on the line 26—26 of FIG. 25;

FIG. 27 is a sectional view taken on the line 27—27 of FIG. 26;

FIG. 28 is a fragmentary view partly in elevation and partly in section illustrating the diffuser embodying this invention, adapted to be mounted in a pan type ceiling;

FIG. 29 is a diagrammatic illustration of the air flow distribution obtained from a six module diffuser using two single throw modules, two double throw modules and two triple throw modules;

FIG. 30 is a diagrammatic illustration of the air flow distribution obtained from a diffuser employing three modules in line, the two end modules being single throw and the middle module double throw;

FIG. 31 is a view in side elevation of the diagrammatic illustration of FIG. 30;

FIG. 32 is a diagrammatic illustration of the air flow distribution from a diffuser employing four modules in line, the end modules being single throw modules and the center modules being double throw modules;

FIG. 33 is a view in side elevation of the diagrammatic illustration of FIG. 32;

Figure 38:
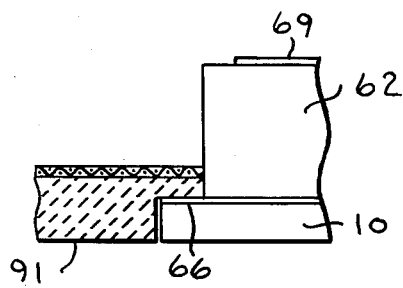
Figure 37:
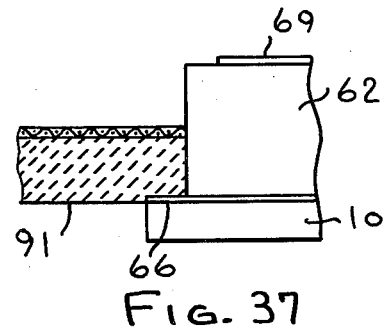

FIG. 37 is an enlarged fragmentary view shown partly in side elevation and partly in section, showing a diffuser mounted in a plaster partition with the seat of the diffuser frame flush with the surface of the partition; and FIG. 38 is an enlarged fragmentary view partly in side elevation and partly in section showing a diffuser mounted in a plaster partition with the face of the module flush with the surface of the partition.

To illustrate the preferred embodiment of this invention, there is shown and described three types of modules and one metal frame. There is also shown and generally described two ways of mounting the metal frame with respect to a plaster partition and one way of mounting the frame with respect to a pan type ceiling. By referring to the diagrammatic illustrations of FIGS. 29 to 34 incl. it is clear that many combinations of modules and frames may be made to effect the desired pattern of air distribution and vary such pattern within the limits of an installed frame without doing more than removing modules and rearranging them or replacing them with other types.

In addition to the previous definitions, as used in this specification: "partition" includes walls, ceilings or floors made of plaster, plaster board, wood, wood paneling, pressed fibre sheets, metal or composition tile, or other like materials; "upstream side" refers to the side at which the air enters the diffuser, frame or module; upstream side is the same as "rear" of the module in all installations, "top" in ceiling installations, "inner side" in wall installations, and "bottom" in floor installations; "downstream side" refers to the side from which air is discharged from the diffuser, frame or module; downstream side is the same as "face" of the module in all installations, "bottom" of the diffuser in ceiling installations, "outer side" in wall installations, and "top" in floor installations.

Figures 1, 2:
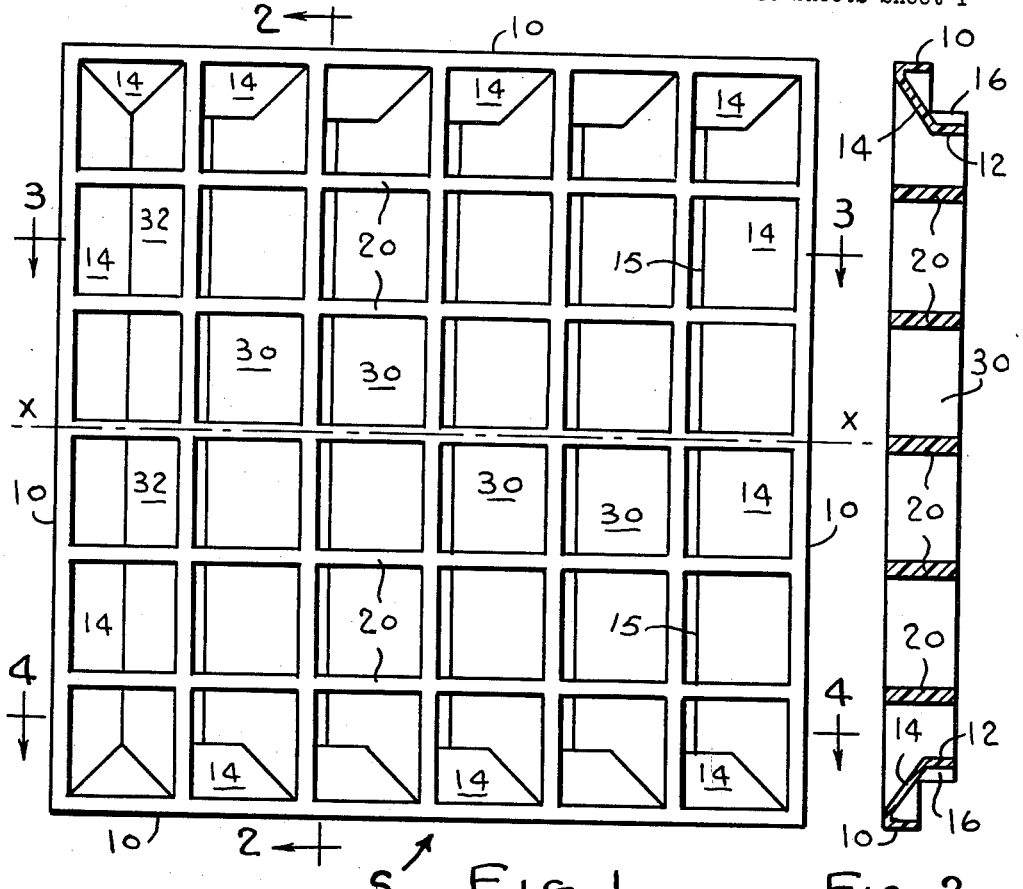
FIG. 1 is a plan view of the face of a single throw module embodying the present invention.
FIG. 2 is a sectional view taken on the line 2—2 of FIG. 1.
Figure 3:
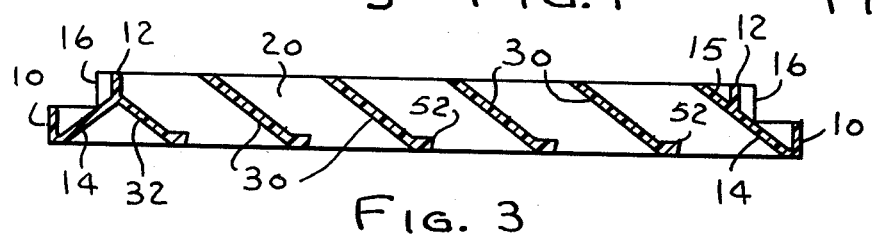
FIG. 3 is a sectional view taken on the line 3—3 of FIG. 1.
Figure 4:
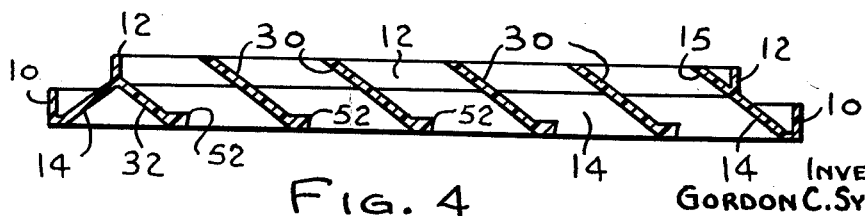
FIG. 4 is a sectional view taken on the line 4—4 of FIG. 1.
Figures 5, 6:
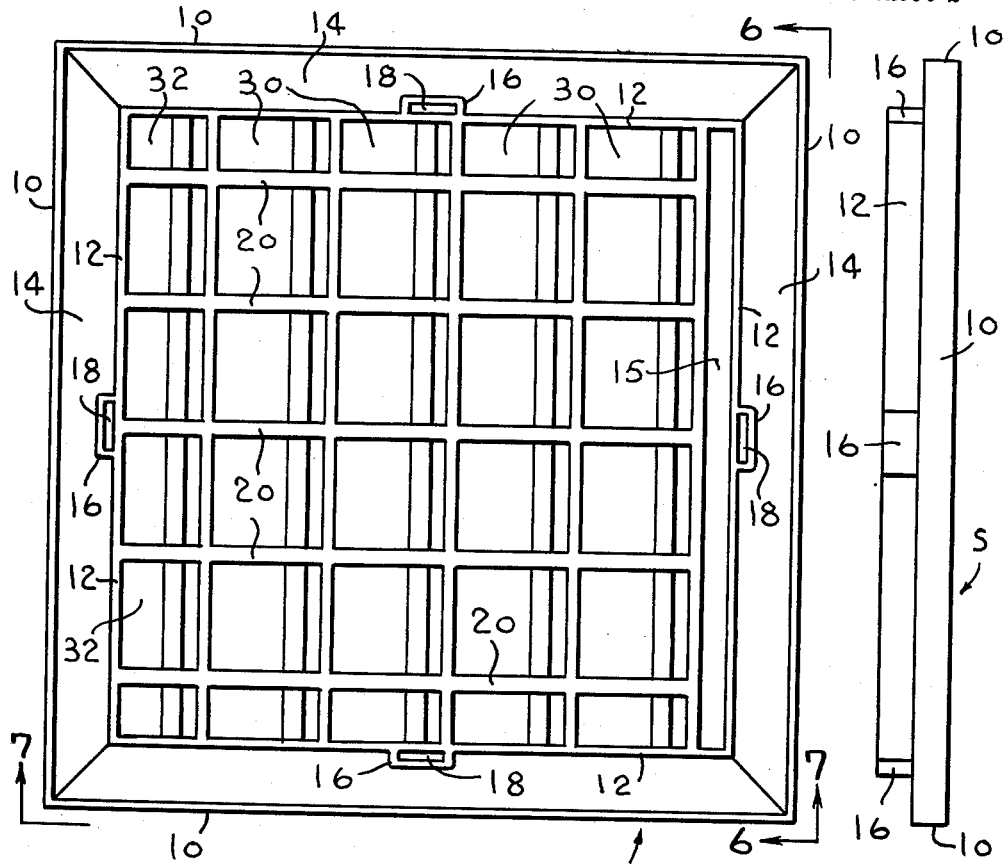
FIG. 5 is a plan view of the rear of the single throw module, as rotated about the line x—x of FIG. 1.
FIG. 6 is a view in side elevation taken from the line 6—6 of FIG. 5.
Figure 7:
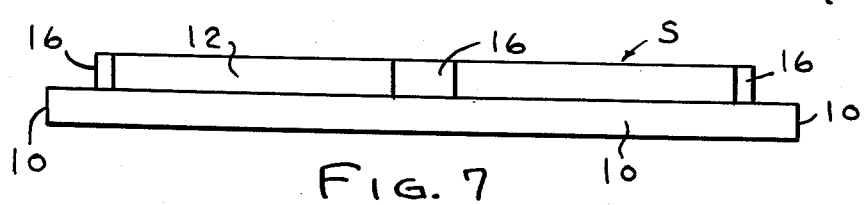
FIG. 7 is a view in side elevation taken from the line 7—7 of FIG. 5.
Figure 8:
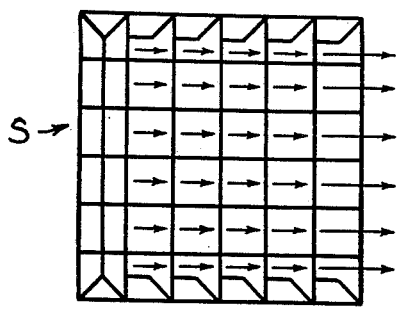
FIG. 8 is a diagrammatic illustration of the air flow distribution from the single throw module.
Figure 16:
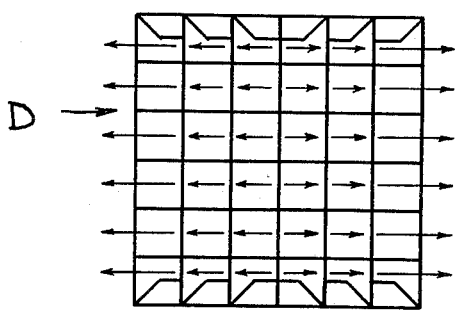
FIG. 16 is a diagrammatic illustration of the air flow distribution of the double throw module.

Referring to the modules or air deflecting and diffusing cores or inserts, module S shown in FIGS. 1 to 8 incl. is a single throw module, that is, the air is deflected laterally in one direction from only the right side (as viewed in FIGS. 1 and 8). Module D shown in FIGS. 9 to 16 incl. is a double throw module, that is, the air is deflected laterally in two directions from the right side and the left side (as viewed in FIGS. 9 and 16). Module T is a triple throw module, that is, the air is deflected laterally in three directions. As viewed in FIGS. 17 and 24, these are from (1) the right side, (2) the top or adjoining side, and (3) diagonally from the top right corner.

Figures 21, 22:
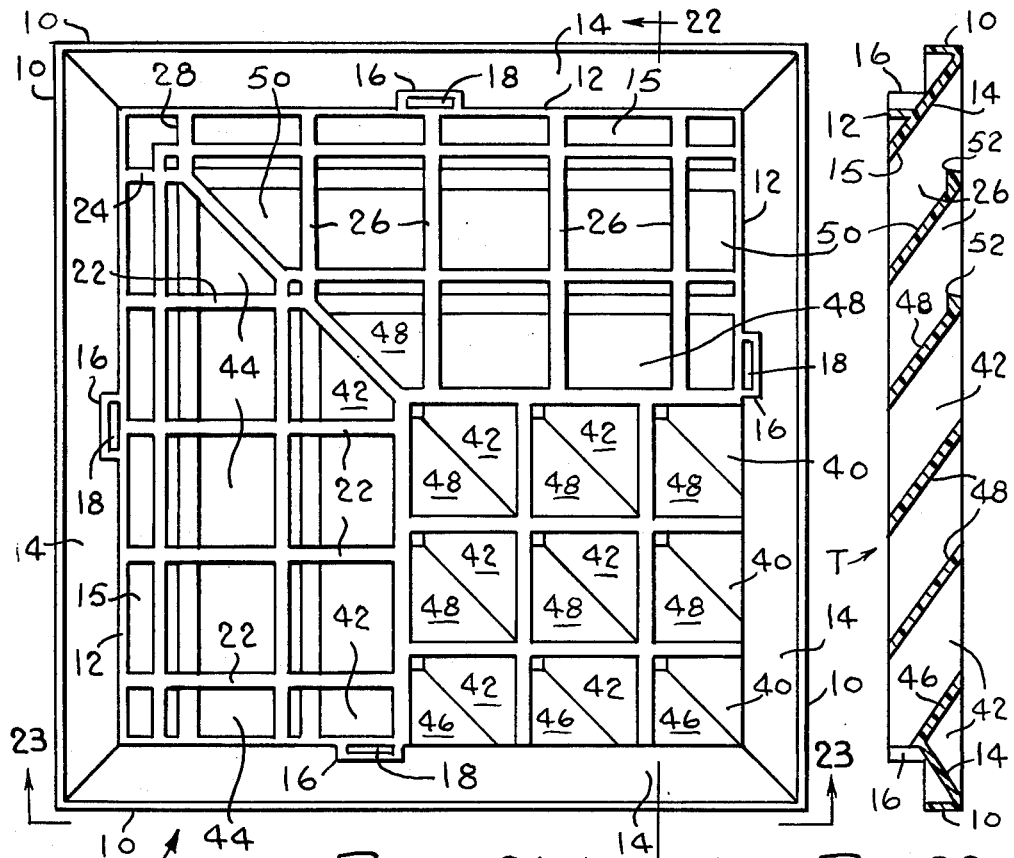
FIG. 21 is a plan view of the rear of the triple throw module.
FIG. 22 is a sectional view taken on the line 22—22 of FIG. 21.
Figure 23:
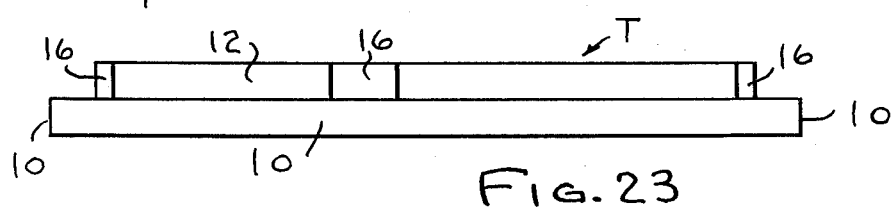
FIG. 23 is a view in side elevation taken from the line 23—23 of FIG. 21.

Each type of module has certain elements common to all and these are designated in the drawings by the same reference numerals. Each module has four equal size face walls 10. These are preferably 5.963" long and 0.281" high. This makes a 6" x 6" standard module with allowance for expansion and contraction and manufacturing tolerance. The module is thus an aliquot of the standard 12" x 12" ceiling tile. Each type module also has four equal size neck walls 12 which are shorter than the face walls 10, say approximately 5" long. The upstream edges of these neck walls are spaced about 0.279" inwardly from the top edges of the face walls to provide the module with a relatively shallow but effective overall depth of 0.560". The downstream edges of the face walls are connected to the downstream edges of the neck wall by sloping partitions 14. Those partitions 14 adjacent those face walls 10 from which air is deflected laterally also have extensions 15 whereby the inner face extends from rear to face parallel with the vanes or louvers hereafter described. Such extensions are on: the right side of module S as viewed in FIGS. 1 and 5; the right and left side of module D as viewed in FIGS. 9 and 13; and the top and right side of module T as viewed in FIGS. 17 and 21. The upstream edges of the face walls provide guides which engage the seat of the frame to locate the upstream position of the module in the frame. Each wall has a pad 16 projecting from such wall generally centrally longitudinally located. These pads have retainer spring pockets 18 into which retaining springs are anchored. The outer walls of the pads 16 form lateral guides for the module when seated in the metal frame, for this reason it is desirable to locate such pads about midway of the neck wall. However, in the case of triple throw module T two of the pads are of necessity slightly offset from center as is seen in FIG. 22.

Figures 9, 10:
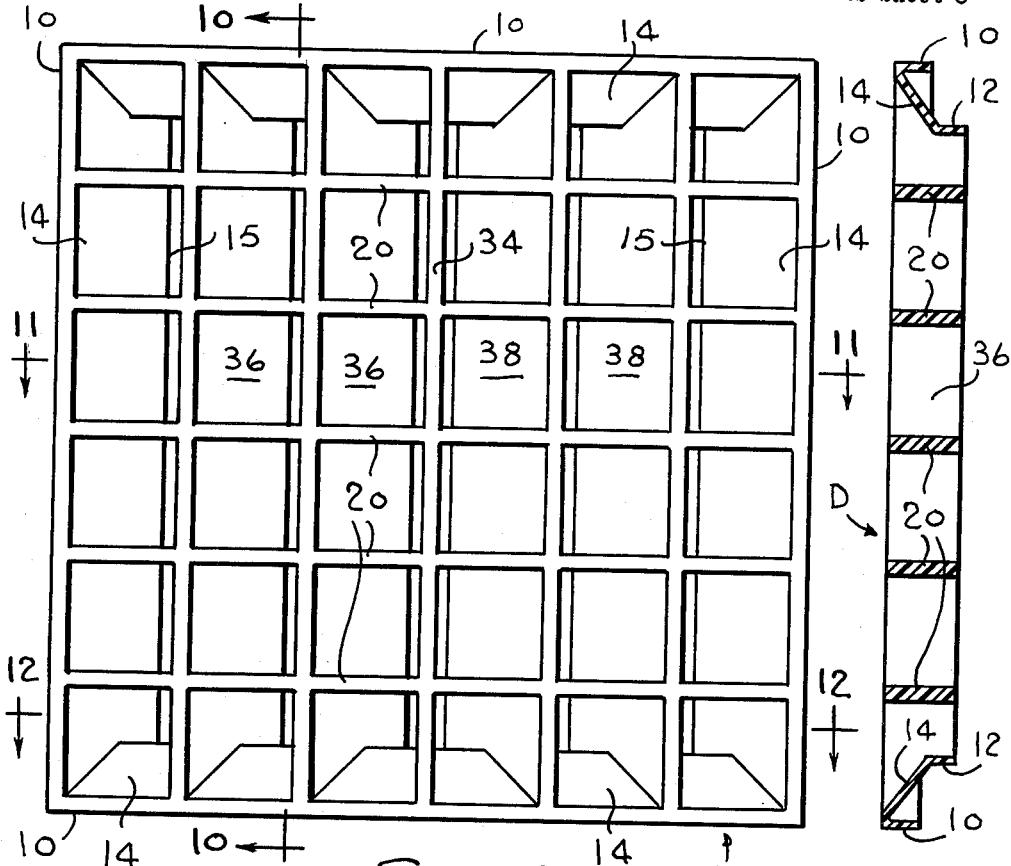
FIG. 9 is a plan view of the face of a double throw module embodying this invention.
FIG. 10 is a sectional view taken on the line 10—10 of FIG. 9.
Figure 11:
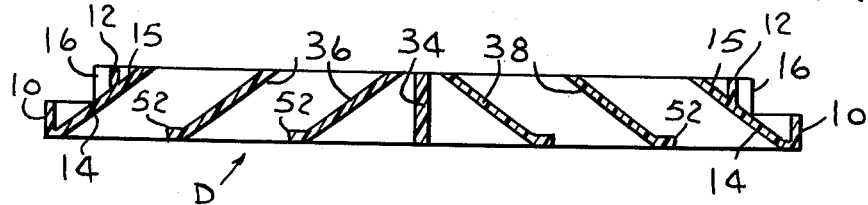
FIG. 11 is a sectional view taken on the line 11—11 of FIG. 9.
Figure 12:
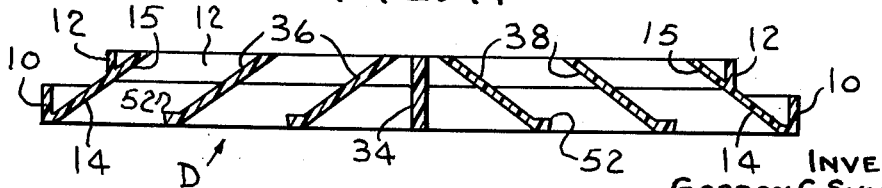
FIG. 12 is a sectional view taken on the line 12—12 of FIG. 9.
Figures 13, 14:
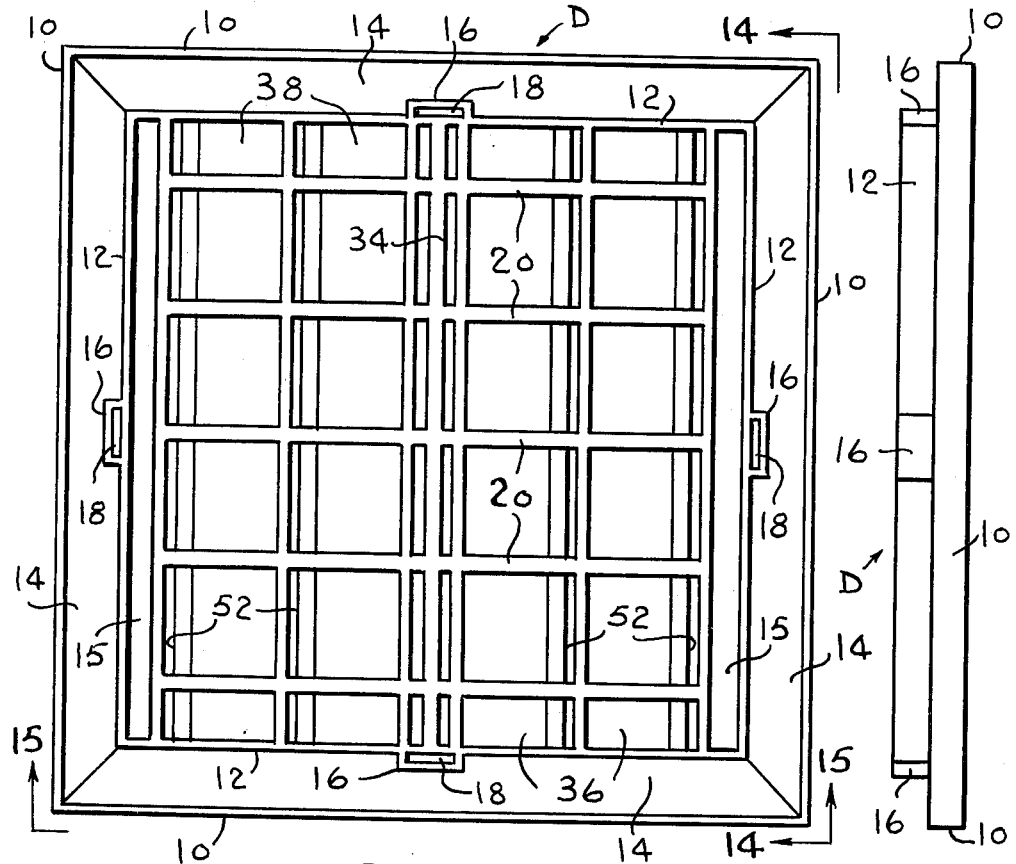
FIG. 13 is a plan view of the rear of the double throw module.
FIG. 14 is a view in side elevation taken from the line 14—14 of FIG. 13.
Figure 15:
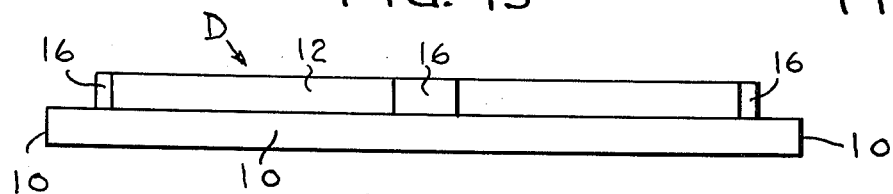
FIG. 15 is a view in side elevation taken from the line 15—15 of FIG. 13.

The single throw module S and the double throw module D have identical evenly spaced parallel diffusing ribs 20 which extend between the right and left sides of the modules as viewed in FIGS. 1 and 9. These ribs have a depth equal to the distance between the face and upstream side of the modules. As viewed from the face of the modules, there are five of these ribs spaced from each other and opposite face walls 10 approximately 0.872". As viewed from the rear in module S (FIG. 5) the ribs 20 are joined to one neck wall 12 and terminate at and are joined to the extension 15. In the case of module D, as viewed from the rear (FIG. 13), the ribs 20 are joined to and extend between the extensions 15. In the triple throw module T, as seen in FIG. 17, there are: extending inwardly from the right face wall 14, four ribs 22 of two squares length and one rib 24 of one square length; and extending downwardly from the top face wall four ribs 26 of two squares length and one rib 28 of one square length. The inner ends of such ribs are joined to the vanes as hereafter described. As previously explained, the planes of these diffusing ribs are substantially perpendicular to the plane of the face and hence do not function to deflect the flow of air laterally of the module. These ribs break the air up into separate streams thus diffusing the flow and cutting down the formation of undesirable drafts. However, other important functions of these ribs are (1) strengthening and rigidifying the module and the deflecting vanes, particularly when molded from plastic and (2) cooperating with the edges of the vanes in the face to create a pleasing uniform honey-comb appearance.

Each of the modules has air deflecting vanes which, with some exceptions, extend width-wise from the rear to the face in planes disposed to the planes of the face and rear at about 30°. The purpose of these vanes is to deflect the air laterally of the module. In module S there are four full width vanes 30 and a short width or narrow vane 32, all parallel and equally spaced. They are pitched as shown to direct air as it leaves the face to the right as viewed in FIGS. 1, 3, 4 and 8. Such vanes are attached to and extend between the face walls 10 sloping partitions 14 and neck walls 12, with the exception of vane 32 which has its ends joined only to the inner end of neck wall 12. Narrow vane 32 has its rear edge joined to the front edges of the adjacent neck wall 12. The vanes 30 and 32 intersect and are connected with the ribs 20 to make a rigid structure and obtain at the face the honey-comb appearance. Because narrow vane 32 connects length-wise with the neck wall 12, the row of openings to the left as viewed in FIG. 1 are not in the air stream and perform no function other than to maintain uniformity of appearance and structural strength.

In module D there is a centrally located dividing wall 34 which extends from face to rear in a plane vertical to that of the face. This module has four deflecting vanes 36 and 38 which have the same structural and functional characteristics as the vanes 30 of module S except that the vanes 36 are pitched to direct air to the left and vanes 38 are pitched to direct air to the right as is shown in FIGS. 9, 11, 12 and 16. The edges of these vanes lying in the face are equally spaced from adjacent vanes, adjacent sloping partitions 14 and adjacent dividing wall 34 to cooperate with the ribs in producing the uniform squared opening appearance.

Figure 24:
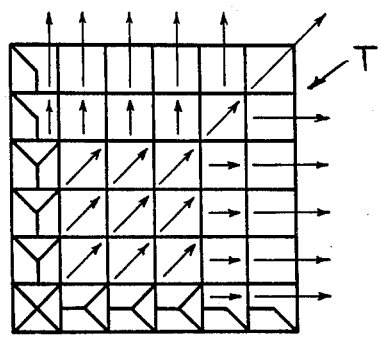
FIG. 24 is a diagrammatic illustration of the air flow distribution of the triple throw module.
Figure 34:
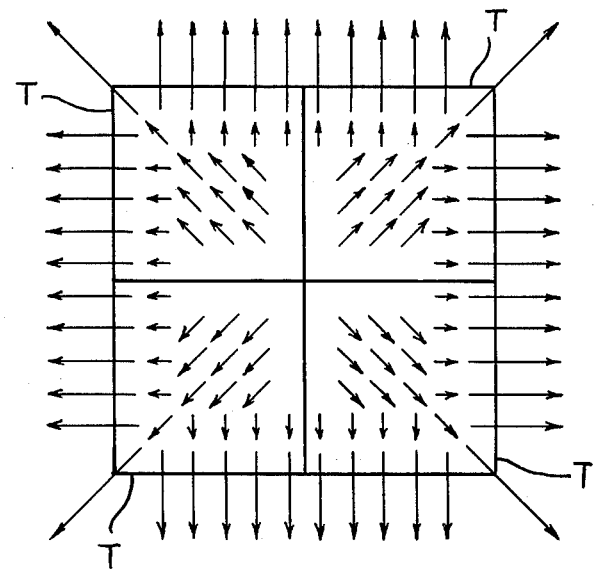
FIG. 34 is a diagrammatic illustration of the air flow distribution from a diffuser employing four triple throw modules.

In module T there are two sets of vanes which extend toward and intersect each other at substantially 90° angles so that the air is deflected in three directions illustrated in FIG. 24. With the exceptions pointed out all these vanes have the same structural and functional characteristics as the corresponding vanes previously described. As viewed in FIG. 17 there are five vanes which are joined to and extend upwardly from the bottom neck walls and sloping partitions and five vanes which are joined to and extend to the right from the left hand neck walls and sloping partitions. Proceeding from left to right as viewed in FIG. 17 are the following upwardly extending vanes: a narrow width vane 40 which intersects and is joined to the inner edge of the adjacent neck wall and extends for four openings; three full width vanes 42 which extend for four openings; and one full width vane 44 which extends for five openings. In the same view proceeding from the bottom there are the following rightwardly extending vanes: a narrow width vane 46 connected to the inner edge of the adjacent sloping partition and extending for four openings; three full width vanes 48 extending for five openings; and one full width vane 50 extending for five openings. The vanes 40 and 42 intersect vane 46 and the three vanes 48 to form nine outlets which direct the air parallel to the diagonal between the lower left hand corner and the upper right hand corner. Vanes 44 and 50 intersect and at the area of such intersection cooperate with the adjacent intersecting vanes 48 and 50 and the adjacent intersecting sloping partitions 14 and extensions 15 to form two more outlets which deflect air laterally along such diagonal. With the exception of this intersecting area the vanes 44 and 50 cooperate respectively with adjacent vanes 42 and 48 and adjacent sloping partitions 14 and extensions 15 to form nine outlets which deflect the air laterally of the upper edge and nine outlets which deflect the air laterally of the right edge as viewed in FIGS. 17 and 24.

It has been found desirable for the purpose of (a) giving an additional lateral deflection to the air so that it more closely parallels the face of the module; (b) imparting some turbulence with resulting increased diffusion and draft elimination; and (c) adding structural strength to the modules to provide the face edge of the vanes with small lips 52. Such lips do not change the uniform squared opening appearance of the face of the module. Hence it is not necessary to place such lips on the edges of those vanes (see FIGS. 19 and 22) of module T which lead to outlets which deflect the air along a diagonal of the opening. There is enough turbulence created by the interimpact of the intersecting streams to obtain the desirable diffusion.

The modules previously described may be removably inserted in specially designed metal frames which are connected to rectangular air ducts of multiple sizes. The module arrangements are many. A few are illustrated in FIGS. 29 to 34 inclusive and will be further described. One essential feature of the metal frame, one embodiment of which is shown in FIGS. 25, 26 and 27, is that its perimeter at the downstream face be rectangular in shape and that the length of the sides be multiples of the 6" sided modules. It is preferable that when the modules are seated in the frame the frame is completely covered and unseen. In practice the overlength of a side of the frame is about $\frac{1}{32}$" less than the total length of the modules seated in the frame. The frame shown in FIGS. 25, 26 and 27 is designed for six modules. Such frame consists of four framing members which are identical in cross section and vary only in length. The opposite ends of each member are cut at 45° angles so that when the members are fitted together they form a 90° angle between them. Viewed in section (see FIGS. 26 and 27) these members have a neck 60 disposed at a 90° angle to a body 62. A wall 64 extends at a 90° angle from this body. The end of this wall has a seat 66 formed by a peripheral flange which extends laterally at a 90° angle from such wall. The edge of this seat is spaced about $\frac{3}{8}$" from the inner side of the wall 64, substantially the distance between the outer surfaces of pad 16 and face wall 10 of the module. Spaced at module intervals along the wall 64 are inwardly depressed ribs forming retainer spring locks 68. These are located so as to align with the central portion of side of a module. The framing members are held together in rectangular shape with abutting angled ends secured by pads 69 spot welded to the adjacent bodies, corner members 70 spot welded to adjacent walls, and corner members 72 spot welded to adjacent necks. Such pads and corner members are advantageous where light gauge sheet metal is employed. With heavier thicknesses of metal the pads and corners may be eliminated and the frame members directly joined by a weld.

In the six module frame shown there must be means for holding those sides of a module which are not adjacent a frame member. This is accomplished by a channel member 74 with outwardly flaring sides facing upstream which extends between and is secured to opposite frame members. This connection may be done by angle brackets 75 welded to such members and channel. This channel equally divides the frame members into module sizes and it is placed so that the distance between the upstream edges of its outwardly flaring sides and seats 66 is substantially the same as the distance between such seats and the spring retaining locks 68 (see FIG. 27). Thus the channel 74 forms a holding means for one side of each module not adjacent a frame member. The other side (or sides) of the modules not adjacent the frame members is held by two channels 76 with sides facing downstream so that where crossing the channels 76 are back to back with the channel 74. The channels 76 are secured to opposite frame members by means such as mounting brackets 80 welded to the channel and frame members. Retainer spring locks 78 are mounted on the backs of channels 76 and spaced to align with the central portion of the sides of the modules. These locks have outwardly flared sides the upstream edges of which lie in the same plane as the upstream edges of channel 74. It is essential that the downstream edges of the sides of channel 76 lie in the same plane as the seats 66 so that the upstream ends of the neck walls 10 of a module are engaged both by seat 66 and the channel 76 thus providing abutments on at least three sides of each module to keep their faces substantially in a single plane.

Figure 35:
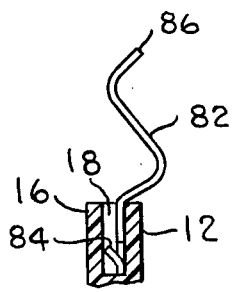
FIG. 35 is an enlarged view partly in section and partly in side elevation showing the retainer spring as anchored in the retainer spring pocket of the module.
Figure 36:
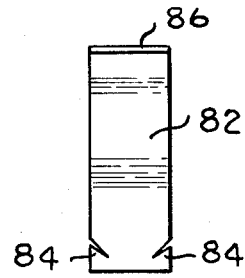
FIG. 36 is a view in front elevation of the retainer spring viewed in FIG. 35 removed from the pocket.

Each module is removably locked in the frame and held on the abutments described by retainer springs 82 which are shaped as shown in FIGS. 35 and 36. The fixed ends of these springs are projecting barbs 84 which fixedly engage the sides of slots 18 in the pads 16 to anchor such springs in place in the module. The outer sides of the pads 16 loosely contact the inner sides of walls 64 and the outer faces of the sides of channels 76 to provide guides for properly laterally locating each module. The retainer springs 82 have tongues 86 which engage with the locks 68, 74 and 78 to force the springs inwardly as the module is inserted in the frame. The springs are long enough so that when the module is seated as described the springs continue to urge the module against such abutments. The modules may be removed for adjustment, cleaning and for replacement by exerting an outward pull which forces the peaks of the springs past the locks without harm to either the spring, module or mounting frame.

When a 6" x 18" frame (see FIG. 30) is required the channel 74 is omitted and each module is abutted on all four sides by the frame members and two channels 76. The same is true of a 6" x 24" frame (see FIG. 32) using three channels 76. In a 12" x 12" frame (see FIG. 34) one channel 74 and one channel 76 is usually specified. Examples of other arrangements conform to the pattern of the foregoing description.

As shown in FIGS. 26 and 27 the mounting frame is secured to the mouth of an air duct 88 by inserting such duct within the neck 60 of the frame and fastening it with a satisfactory number of self-locking screws 90. There are at least two ways of relating the frame with respect to a plaster ceiling or partition. In FIG. 37 the frame has its seat 66 flush with the plaster surface 91 and in FIG. 38 the seat 66 is recessed from the plaster surface the depth of the face wall 10 of a module. Plastering templets or forms of required dimensions are used in a well known manner to form the proper recesses.

The mounting frame can be readily mounted on the supports of a pan type ceiling of the character shown in U.S. Patent No. 2,276,788 by adding to two opposite walls 64 a special lock 92 with locking dimple 94 as shown in FIG. 28. Such lock snaps into the furring strip 96 in the same way as the locks 98 for the pan type ceiling units 100.

The diagrammatic illustration of various arrangements shown in FIGS. 29 to 34 inclusive show examples of how the three modules S, D and T may be used to gain the required direction of air throw and diffusion. In FIG. 29 going from left to right there are two modules S with throws oppositely relateral, two modules D with throws toward and away from each other, and two modules T with diagonal throws away from the corners of the diffuser. This arrangement provides a diffusion laterally of three sides, diagonally at two corners and vertically at the center. The bucking of the throws from the inner halves of each module D results in a component throw which is substantially perpendicular to the face of the diffuser. Throws of multiplied volume from opposite ends of the diffuser are obtained by the arrangement of two modules S and one module D as shown in FIGS. 30 and 31. The two modules S and two modules D arranged as shown in FIGS. 32 and 33 produce multiplied volume of throws from one end and a perpendicular throw. The four sided and four cornered lateral throw of the diffuser arrangement shown in FIG. 34 obtained by four modules T will be practical in many standard air distributing designs.

We claim:

1. A module for a diffuser comprising an air deflecting and diffusing core having four equal size face walls defining a square face outlining the downstream surface of said module and four equal size neck walls shorter than said face walls outlining the upstream surface of said module, said face walls and said neck walls being connected by sloping partitions, said square face being substantially equally divided by spaced parallel vanes inclined to said face and parallel ribs and spaced equal to the spacing of said vanes to form square openings in said face positioned at substantially right angles to said vanes and substantially perpendicular to said face, said vanes and ribs extending from said face to the rear upstream surface of said module and supported by said walls and partitions.

2. The module as claimed in claim 1 in which part of said vanes are inclined outwardly toward one side of said face and part of said vanes are inclined outwardly toward the opposite side of said face to form an oppositely directed double throw module.

3. The module as claimed in claim 1 in which part of said vanes are inclined outwardly toward one side of said face and part of said vanes are inclined outwardly toward an adjoining side of said face to form a double throw module with the throws at right angles to each other.

4. The module as claimed in claim 3 in which some of said vanes intersect along intersection lines substantially parallel with the diagonal of said module to form a triple throw module with two throws normal to adjoining sides of said face and a third throw at substantially a 45° angle to each of said adjoining sides of said face.

5. The module as claimed in claim 1 in which the edges of said vanes at the face of said module have lips which strengthen said vanes and aid diffusion of the air passing through said module said lips having lower faces parallel to the plane of said downstream surface.

6. The module as claimed in claim 1 in which said face walls have an upstream edge which constitutes a stop positioned intermediate said downstream and upstream surfaces used in positioning said module in a mounting frame.

7. The module as claimed in claim 6 in which said neck walls have projecting pads defining retainer spring pockets and forming lateral guides for said module, and in which there are retainer springs having ends with projecting barbs mounted in said pockets in said neck walls with said barbs engaging the sides of said pockets to anchor said springs in place.

8. An air diffuser comprising: a metal frame having a duct engaging neck, side walls positioned laterally outward of said neck, a body connected to said neck and said side walls, said side walls having retainer spring locks, and a peripheral flange extending outwardly of said side walls and forming a module seat; an air diffusing and deflecting module having neck walls positioned within said side walls, said module having face walls the outer sides of which are in substantial alignment with the edges of said flange so that said module hides said frame, the inward edges of said face walls engaging said module seat to properly locate said module; and retainer springs mounted on said module neck walls and engaged with said retainer spring locks to removably hold said module in said frame.

9. An air diffuser as claimed in claim 8 in which said frame has a module seat of a length and width sufficient to exactly accommodate at least two modules along each side with their adjacent face walls spaced only enough to allow for normal expansion, an inturned channel having sides providing a lock for the retainer springs on one face wall of each module, said channel being secured to one set of opposite frame side walls, and an out-turned channel having edges of the sides thereof providing an auxiliary module seat, said out-turned channel being secured to the other set of opposite frame side walls, said out-turned channel having on its in-turned face retainer spring locks for the retainer springs on another face wall of each module, there being four of said modules removably positioned in said frame with the edges of said face walls engaging both said module seat and said auxiliary module seat to properly locate said modules, the retainer spring on one module neck wall of each module engaging the retainer spring lock provided by said inturned channel, and the retainer spring on another module neck wall of each module engaging the retainer spring lock mounted on the out-turned channel.

References Cited in the file of this patent

UNITED STATES PATENTS

| | | |
|---|---|---|
| 2,116,873 | Williams | May 10, 1938 |
| 2,146,339 | Jackson | Feb. 7, 1939 |

(Other references on following page)

UNITED STATES PATENTS

| | | | |
|---|---|---|---|
| 2,734,446 | O'Day | Feb. 14, | 1956 |
| 2,735,352 | De Muth | Feb. 21, | 1956 |
| 2,786,407 | Sarles | Mar. 26, | 1957 |
| 2,792,985 | Heiman | May 21, | 1957 |
| 2,824,429 | Zucker | Feb. 25, | 1958 |
| 2,865,277 | Howe | Dec. 23, | 1958 |
| 2,909,112 | Yousoufian | Oct. 20, | 1959 |
| 2,977,869 | O'Day | Apr. 4, | 1961 |
| 2,982,197 | Roberts | Mar. 2, | 1961 |

OTHER REFERENCES

A publication by Air Devices Inc., published 1953, pages 3 to 6 and 10.